(12) United States Patent
Catellani et al.

(10) Patent No.: US 9,409,368 B2
(45) Date of Patent: Aug. 9, 2016

(54) FOLDING UNIT FOR POURABLE FOOD PRODUCT PACKAGING MACHINES

(71) Applicant: TETRA LAVAL HOLDINGS & FINANCE S.A., Pully (CH)

(72) Inventors: Andrea Catellani, Modena (IT); Richard John Pedretti, Formigine (IT); Massimo Pradelli, Reggio Emilia (IT)

(73) Assignee: TETRA LAVAL HLDINGS & FINANCE S.A., Pull (CH)

( * ) Notice: Subject to any disclaimer, the term of this patent is extended or adjusted under 35 U.S.C. 154(b) by 0 days.

(21) Appl. No.: 14/369,905

(22) PCT Filed: Feb. 14, 2013

(86) PCT No.: PCT/EP2013/052928
§ 371 (c)(1),
(2) Date: Jun. 30, 2014

(87) PCT Pub. No.: WO2013/124200
PCT Pub. Date: Aug. 29, 2013

(65) Prior Publication Data
US 2014/0371046 A1     Dec. 18, 2014

(30) Foreign Application Priority Data

Feb. 24, 2012   (EP) .................................. 12157008

(51) Int. Cl.
*B31B 3/02*        (2006.01)
*B65B 51/20*      (2006.01)
(Continued)

(52) U.S. Cl.
CPC ... *B31B 3/02* (2013.01); *B65B 7/20* (2013.01); *B65B 51/20* (2013.01); *B65B 61/24* (2013.01);
(Continued)

(58) Field of Classification Search
CPC ...... B31B 3/00; B31B 2201/267; B31B 1/52; B31B 2201/2654; B31B 2203/003; B31B 37/00; B31B 3/02; B65B 5/024
See application file for complete search history.

(56) References Cited

U.S. PATENT DOCUMENTS 4,929,299 A      5/1990   Romagnoli
5,324,250 A *   6/1994   Janson et al. ................. 493/133
(Continued)

FOREIGN PATENT DOCUMENTS

CN        1203879 A       1/1999
CN        1297444 C       1/2007
(Continued)

OTHER PUBLICATIONS

International Search Report (PCT/ISA/210) mailed on May 23, 2013, by the European Patent Office as the International Searching Authority for International Application No. PCT/EP2013/052928.
(Continued)

*Primary Examiner* — Sameh Tawfik
(74) *Attorney, Agent, or Firm* — Buchanan Ingersoll & Rooney PC

(57) ABSTRACT

A folding unit for producing packages of pourable food products from sealed packs having main portion and opposite end portions; each pack comprising, for each end portion, a fin and a pair of flaps projecting laterally from main portion; unit comprises: a conveyor fed with a plurality of packs and which feeds the pack along a forming path; and a folder interacting with each pack to fold relative end fin onto a relative end portion; conveyor comprises first and second links articulated to each other; second link is arranged downstream of first link, relative to a first advancing direction of conveyor; folder comprises: a slot defined by first link to receive end fin; and a slide operatively connected to second link and movable between a first position at least partially engaging slot, to fold end fin onto a relative end portion, and a second position detached from slot.

12 Claims, 18 Drawing Sheets

(51) Int. Cl.
*B65B 61/24* (2006.01)
*B65B 7/20* (2006.01)
*B29C 65/10* (2006.01)
*B29C 65/78* (2006.01)
*B29C 65/00* (2006.01)
*B29L 31/00* (2006.01)

(52) U.S. Cl.
CPC ........... *B29C 65/103* (2013.01); *B29C 65/7882* (2013.01); *B29C 66/43121* (2013.01); *B29C 66/7234* (2013.01); *B29C 66/72321* (2013.01); *B29C 66/72328* (2013.01); *B29C 66/72341* (2013.01); *B29L 2031/7166* (2013.01)

(56) References Cited

U.S. PATENT DOCUMENTS

| | | | |
|---|---|---|---|
| 5,768,852 A * | 6/1998 | Terminella et al. | 53/133.4 |
| 8,668,071 B2 * | 3/2014 | Florentzson et al. | 198/403 |
| 2009/0113848 A1 | 5/2009 | Santi | |
| 2012/0122642 A1 | 5/2012 | Santi | |
| 2012/0233966 A1 * | 9/2012 | Vetten et al. | 53/436 |

FOREIGN PATENT DOCUMENTS

| | | |
|---|---|---|
| CN | 101180218 A | 5/2008 |
| CN | 101395063 A | 3/2009 |
| CN | 101652288 A | 2/2010 |
| DE | 3807793 C2 | 7/1996 |
| EP | 0 271 759 A2 | 6/1988 |
| EP | 1 726 526 A1 | 11/2006 |
| EP | 2 284 084 A1 | 2/2011 |
| JP | 2004-238065 A | 8/2004 |
| WO | WO 95/34472 A1 | 12/1995 |
| WO | 2006/122962 A1 | 11/2006 |

OTHER PUBLICATIONS

Written Opinion (PCT/ISA/237) mailed on May 23, 2013, by the European Patent Office as the International Searching Authority for International Application No. PCT/EP2013/052928.

Chinese Office Action issued Apr. 24, 2015, by the Chinese Patent Office, in Chinese Patent Application No. 201380010624.5, and English language translation of Official Action (15 pgs).

Second Office Action and Search Report issued on Dec. 2, 2015, by the State Intellectual Property Office of People's Republic of China in corresponding Chinese Patent Application No. 201380010624.5 and an English translation of the Office Action (18 pgs).

* cited by examiner

FOLDING UNIT FOR POURABLE FOOD PRODUCT PACKAGING MACHINES

TECHNICAL FIELD

The present invention relates to a folding unit for producing folded packages of pourable food products from relative sealed packs.

BACKGROUND OF INVENTION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material may also comprise a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material. The web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating. The web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which may be fed to a folding unit to form the finished packages.

More specifically, the pillow packs substantially comprise a main portion, and opposite top and bottom end portions tapering from the main portions towards respective top and bottom sealing bands which extends substantially orthogonal to the axis of the pack. In detail, each end portion is defined by a pair of respective trapezoidal walls which extend between main portion of the pack and the relative sealing band.

Each pillow pack also comprises, for each top and bottom end portion, an elongated substantially rectangular fin formed by respective sealing band; and a pair of substantially triangular flaps projecting from opposite sides of relative end portion and defined by end portions of respective trapezoidal walls and by corresponding triangular portions which project from the main portion.

The end portions are pressed towards each other by the folding unit to form flat opposite end walls of the pack, while at the same time folding the flaps of the top portion onto respective lateral walls of the main portion and the flaps of the bottom portion onto the bottom sealing band.

Packaging machines for producing packages of the above type are known, typically comprising:
- an in-feed conveyor;
- a folding unit receiving the pillow packs from the in-feed conveyor and adapted to fold these pillow packs to form the parallelepiped-shaped packages;
- a transfer unit for transferring and up-ending sealed folded packages, which is arranged downstream from the folding unit and receives the sealed packages from the folding unit; and
- an out-feed conveyor which receives folded packages from the transfer unit and moves them away from the packaging machine.

Folding units are known, for example from EP-A-0887261 in the name of the same Applicant, which substantially comprise:
- a chain conveyor for feeding packs continuously along a forming path from a supply station to an output station; and
- first folding means and second folding means, which cooperate cyclically with each pack to flatten respective end portions of each pack and so fold respective fins onto end portions.

In detail, the first folding means comprise a fixed guide member, which is positioned facing and at a distance from a conveying portion of the chain, and converge towards this conveying portion. The fixed guide member cooperates with bottom end portion of each pack to press it down flat towards the chain.

The second folding means comprise a pair of contrast elements defined by parallel elongated sections fitted to a fixed frame adjacent to respective opposite lateral edges of the chain conveyor. More precisely, the contrast elements cooperate in sliding manner with the top end portion of each pack to fold the top fin towards the main portion of the relative pack, and top flaps onto this main portion.

In this way, as the chain conveyor feeds the packs in a first direction, the relative top fins are folded onto the flattened main portion in a second direction, opposite to the first direction.

In detail, the top fins are folded onto the flattened main portion on the opposite side of a longitudinal sealing band.

Though efficient, packaging machines of the above type leave room for improvement.

In particular, a need is felt within the industry to render as controllable as possible the folding of the top fins onto the flattened main portion of the corresponding packs.

In particular, a need is felt within the industry to fold the top fin as coplanar as possible onto the flattened main portion.

DISCLOSURE OF INVENTION

It is an object of the present invention to provide a folding unit for a pourable food product machine, designed to provide a straightforward, low-cost solution to meet at least one of the above need, typically associated with the known folding unit.

According to the present invention, there is provided a folding unit for producing folded packages of pourable food products from relative sealed packs, as claimed in claim 1.

BRIEF DESCRIPTION OF THE DRAWINGS

FIG. 18 shows in a perspective enlarged view a pack the folding unit of FIGS. 1 to 17 is fed with.

DETAILED DESCRIPTION OF PREFERRED EMBODIMENTS

Figure 1:
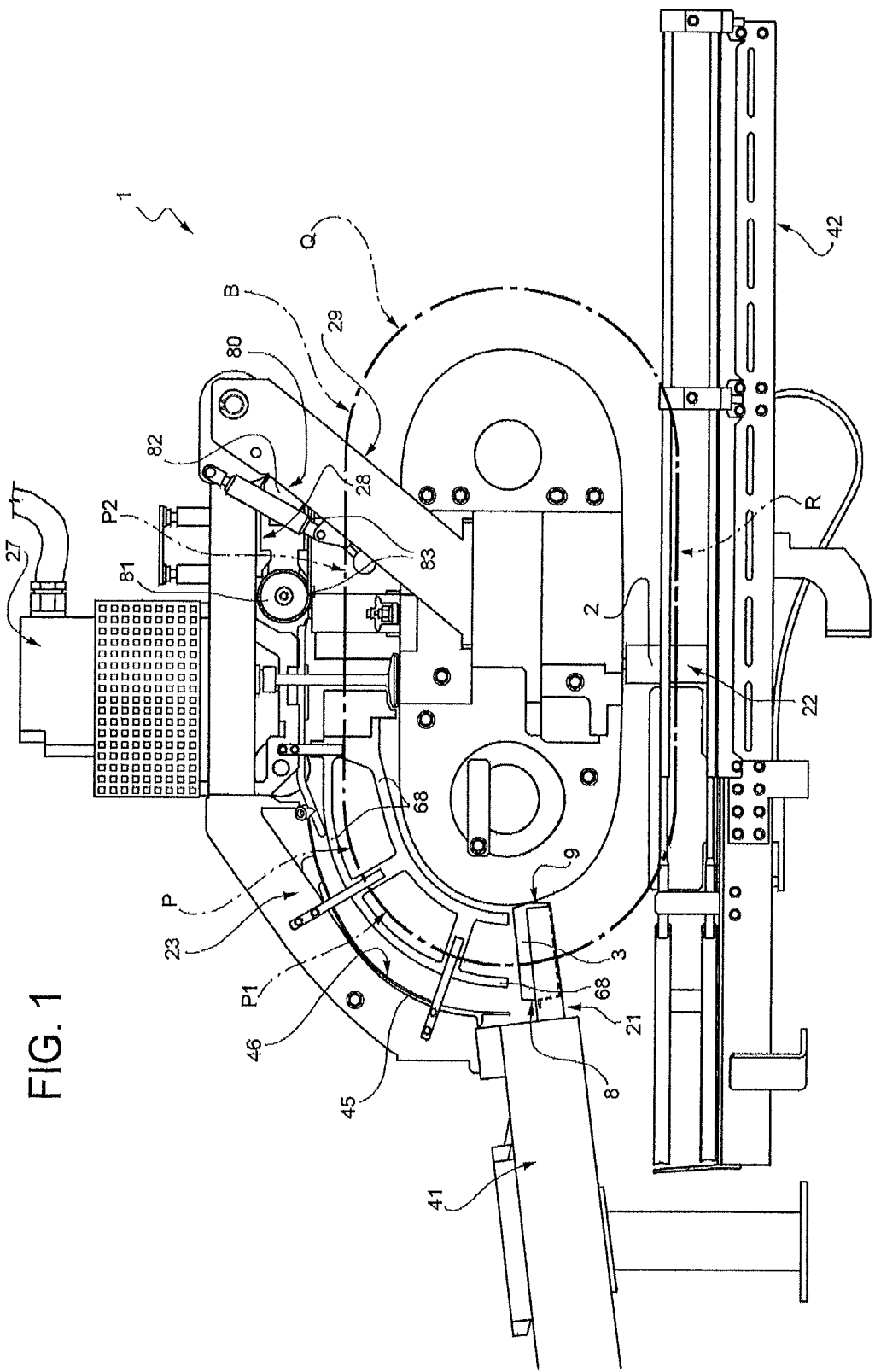
FIG. 1 shows a side view, with parts removed for clarity, of a folding unit in accordance with the present invention for producing folded packages of pourable food products from sealed pillow packs.

Number 1 in FIG. 1 indicates as a whole a folding unit for a packaging machine (not shown) for continuously producing sealed packages 2 of a pourable food product, such as pasteurized or UHT milk, fruit juice, wine, etc., from a known tube of packaging material (not shown).

The tube is formed in known manner upstream from unit 1 by longitudinally folding and sealing a known web (not shown) of heat-seal sheet material which may comprise a base layer for stiffness and strength, which may be formed by a layer of fibrous material, e.g. paper, or of mineral-filled polypropylene material, and a number of layers of heat-seal plastic material, e.g. polyethylene film, covering both sides of the base layer. In the case of an aseptic package for long-storage products, such as UHT milk, the packaging material may also comprises a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package 2 eventually contacting the food product.

The tube of packaging material is then filled with the food product, and is sealed and cut along equally spaced cross sections to form a number of pillow packs 3 (FIG. 18), which are then transferred to unit 1 where they are folded mechanically to form respective parallelepiped-shaped packages 2.

Alternatively, the packaging material may be cut into blanks, which are formed into packages 2 with forming spindles, and packages 2 are filled with the food product and sealed. One example of this type of package is the so-called "gable-top" package known by the trade name Tetra Rex (registered trademark).

In detail, unit 1 receives pillow packs 3 from an in-feed conveyor 41 and feeds folded package 2 to out-feed conveyor 42 (FIG. 1).

Figure 18:
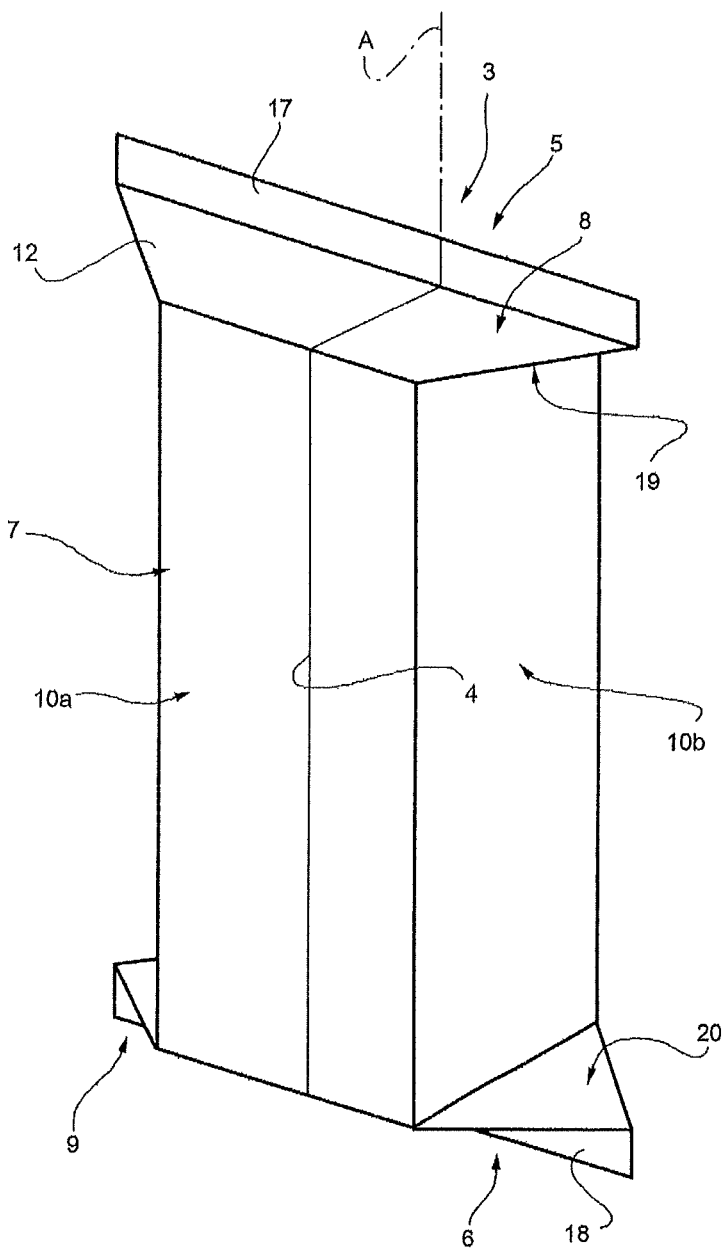

With reference to FIG. 18, an embodiment of a pack 3 is shown which has a longitudinal sealing band 4, formed to produce the tube of packaging material from the web folded into a cylinder, extends along one side of each pack 3, which is closed at the opposite ends by respective transverse sealing bands 5, 6 perpendicular to and joined to longitudinal sealing band 4.

Each pack 3 has an axis A, and comprises a main body 7 and opposite, respectively top and bottom, end portions 8, 9 tapering from main body 7 towards respective transverse sealing bands 5, 6.

Main body 7 of each pack 3 is bounded laterally by two lateral walls 10*a* and two lateral walls 10*b* which are alternate to each other.

Each end portion 8, 9 is defined by two walls 12, each substantially in the form of an isosceles trapezium, which slope slightly towards each other with respect to a plane perpendicular to axis A, and have minor edges defined by respective top and bottom end edges of respective wall 10*a*, and major edges joined to each other by respective sealing bands 5, 6.

Longitudinal sealing band 4 extends between transverse sealing bands 5 and 6, and along the whole of one wall 10*a* and the corresponding walls 12 on the same side as wall 10*a*.

Each pack 3 also comprises, for each end portion 8, 9, a respective substantially elongated rectangular end fin 17, 18 formed by respective sealing bands 5, 6 and projecting in the direction of axis A from relative pack 3; and two substantially triangular flaps 19, 20 projecting laterally on opposite sides of main body 7, and defined by end portions of relative walls 12 and by corresponding triangular end portions of lateral walls 10*b*.

More precisely, each end fin 17, 18 extends along a direction orthogonal to axis A.

To form a package 2, unit 1 presses end portions 8, 9 of relative pack 3 down flat towards each other, and at the same time folds respective fins 17, 18 onto flattened end portions 8, 9. In particular, fin 18 is folded onto end portion 9 on the opposite side of sealing band 4.

Furthermore, unit 1 folds flaps 20 onto top ends of respective walls 10*b* towards end portion 8 and folds flaps 19 onto previously folded fin 17, on the opposite side of end portion 9.

With reference to FIGS. 1, 2, 8 and 9, unit 1 substantially comprises:

a frame 29;

an endless conveyor 34 for feeding packs 3 continuously along a forming path B from a supply station 21 to an output station 22 (both shown only schematically);

folding means 23 which cooperate cyclically with each pack 3 to flatten end portion 8, fold relative fin 17 onto end portion 8, and fold flaps 19 onto previously flattened end portion 8 on the opposite side of end portion 9;

folding means 24 for folding relative fin 18 onto flattened portion 9;

folding means 37 for bending flaps 20 towards axis A and end portion 8;

a heating device 27 acting on bent flaps 19, to melt the external layer of the packaging material of flaps 19, 20 before they are pressed and sealed against end portion 8 and relative walls 10*b* respectively; and a pressing device 28 cooperating with each pack 3 to hold flaps 19 onto flattened fin 17 as flaps 19 cool.

As packs 3 advance along path B, wall 10a with longitudinal sealing band 4 is arranged downstream of wall 10a without longitudinal sealing band 4.

Heating device 27 is, in particular, arranged between folding means 23 and pressure device 28 along forming path B.

With particular reference to FIGS. 2, 4, 5 and 6, conveyor 34 basically comprises an endless transport element, in the example shown a chain 60, formed by a plurality of mutually hinged rigid modules or links 35 and looped about a pair of coaxial driving sprockets 26 and a cam 25.

Chain 60 comprises a straight horizontal top branch 30, a bottom branch 31 substantially parallel to branch 30, and two curved C-shaped portions 32, 33, which are positioned with their concavities facing each other and connect branches 30 and 31; more specifically, C-shaped portion 32 cooperates with driving sprockets 26, whilst C-shaped portion 33 cooperates with cam 25.

Each link 35 comprises a substantially flat plate 36 adapted to receive a relative pack 3, and a paddle 43, which projects perpendicularly from plate 36 on the opposite side of driving sprockets 26 and cam 25 and which cooperates with and pushes a corresponding wall 10a of a relative pack 3 to feed it along path B.

In particular, paddle 43 of each link 35 cooperates with wall 10a without longitudinal sealing band 4.

Cam 25 is described in more detail in the European application "Folding unit for producing folded packages of pourable food products from relative sealed packs", filed by the Applicant with the application number EP11187351.9.

Unit 1 comprises (FIGS. 5 and 9 to 14) a plurality of pairs of shells 50 which are integrally movable along path B and are movable along a direction C transversal to path B; shells 50 of each pair may be arranged in:

a fully closed position in which they exert a pressure onto a relative pack 3, so as to complete a folding operation thereon; and an open position in which they are detached from folded package 2.

Furthermore, shells 50 may be arranged also in a closed position, in which they grip folded package 2 but substantially do not exert any pressure thereon.

In detail, station 21 is defined by C-shaped portion 32 and station 22 is defined by bottom branch 31 in a position closer to C-shaped portion 32 than to C-shaped portion 33.

Path B comprises (FIG. 2), proceeding from station 21 to station 22:

a portion P starting from station 21, comprising a curved stretch P1 and a straight stretches P2, along which packs 3 are folded into relative packages 2;

a curved portion Q along which folded packages 2 are overturned of 180 degrees; and a straight portion R arranged downstream from curved portion Q and upstream from station 22.

In detail, stretch P1 is defined by a part of C-shaped portion 32 and stretch P2 is defined by top branch 30 of chain 60. Portion Q is defined by C-shaped portion 33, and portion R is defined by part of bottom branch 31 of chain 60.

Folding means 23 cooperate cyclically with each pack 3 along portion P.

Folding means 24 are defined by links 35 and, therefore, move together with chain 60 along path B.

Figure 8:
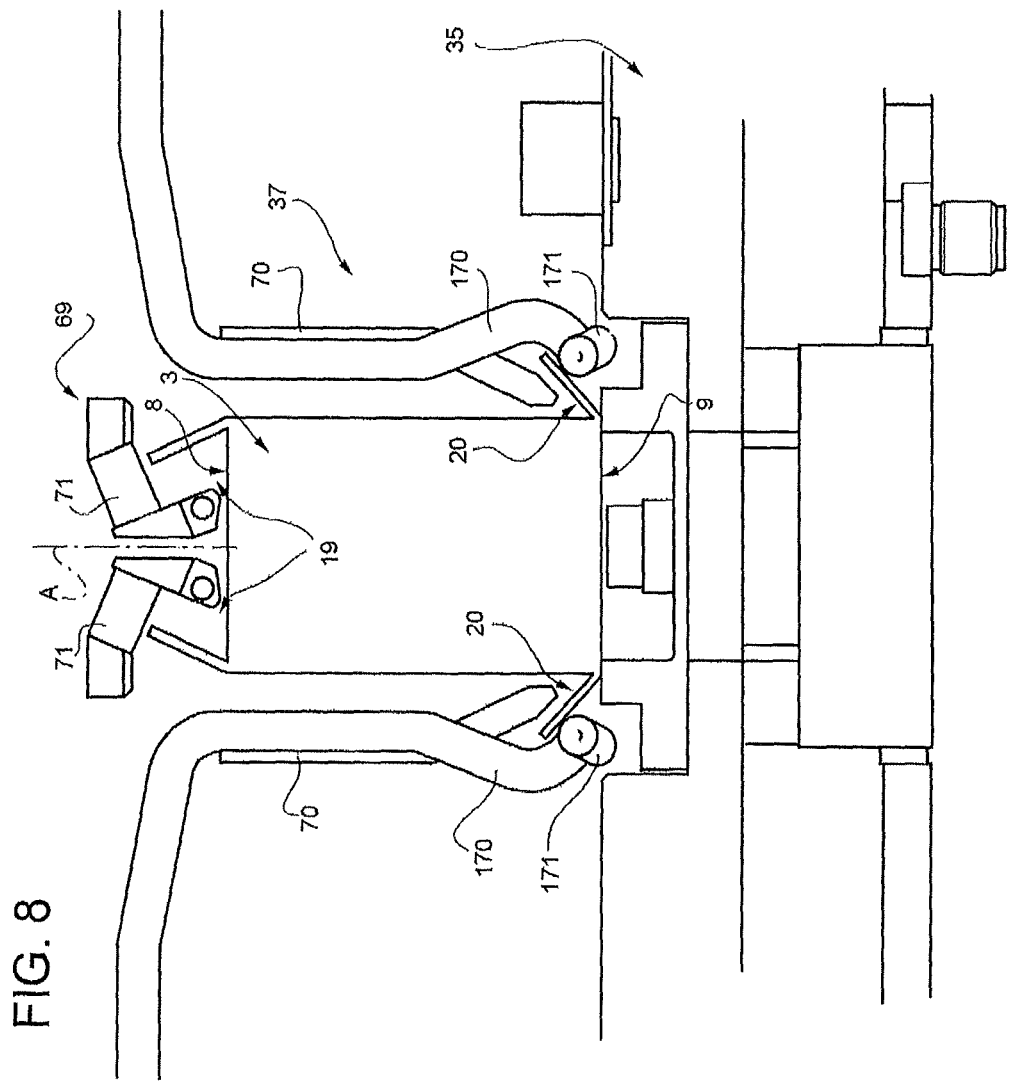
FIG. 8 is a front view of a fin of a pack positioned adjacent the folding means for bending the fin toward the end portion of the pack.
Figure 9:
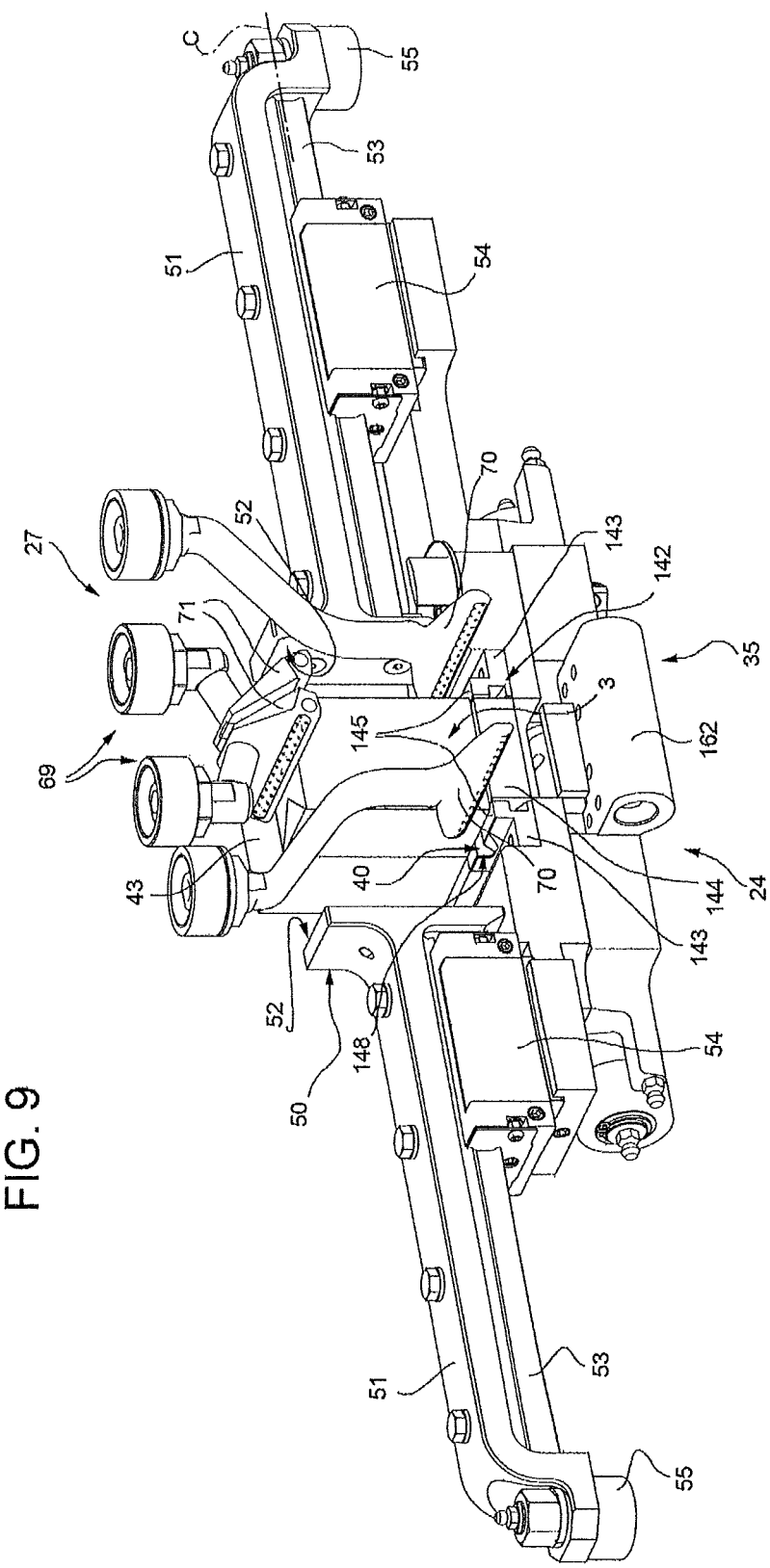
FIG. 9 is a perspective view of the folding means for folding the fin onto the flattened end portion of the pack.

In detail, folding means 24 flatten end portion 9, folds relative fin 18 onto portion 9 and bend flaps 20 towards axis A and end portion 8, as relative pack 2 is carried along stretch P1 of portion P (FIGS. 8 and 9).

Heating device 27 acts on bent flaps 19, 20 to melt the external layer of the packaging material of flaps 19, 20 before they are pressed and sealed against end portion 8 and top ends of relative walls 10b respectively, as pack 2 is carried along stretch P2 of portion P (FIG. 9).

In detail, shells 50 of each pair cyclically move according to the following work cycle.

Shells 50 of each pair are arranged in the open position at station 21, move from the open position to the fully closed position along stretch P1 and an initial part of stretch P2, and reach the fully closed position along a remaining part of stretch P2. In the embodiment shown, shells 50 reach the fully closed position downstream from heating device 27 and upstream from pressing device 28, proceeding according to the advancing direction of chain 60.

When shells 50 are arranged into the fully closed position they exert a certain pressure on relative walls 10b adjacent thereto.

More precisely, as moving between the open position and the fully closed position along stretch P2 of portion P, shells 50 of each link 35 perform two functions:

firstly, they complete the bending of flaps 20 relative walls 10b; and then, they press flaps 20, which have been previously bent and heated, onto top ends of relative walls 10b.

Furthermore, shells 50 of each pair move from the fully closed position into the closed position at the beginning of portion Q.

Figure 6:
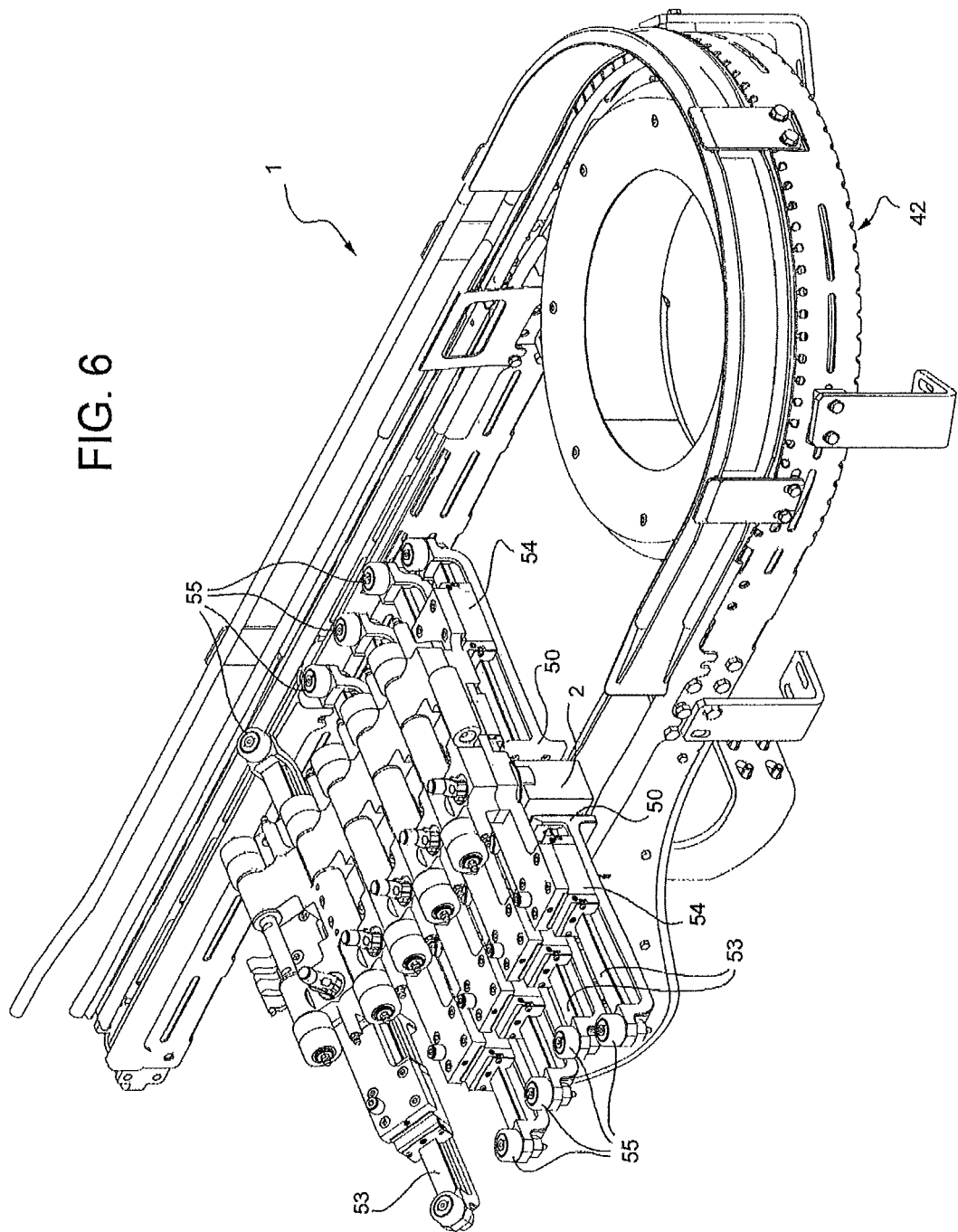
FIG. 6 is a perspective view of a portion of the folding unit depicted in FIG. 2.
Figure 7:
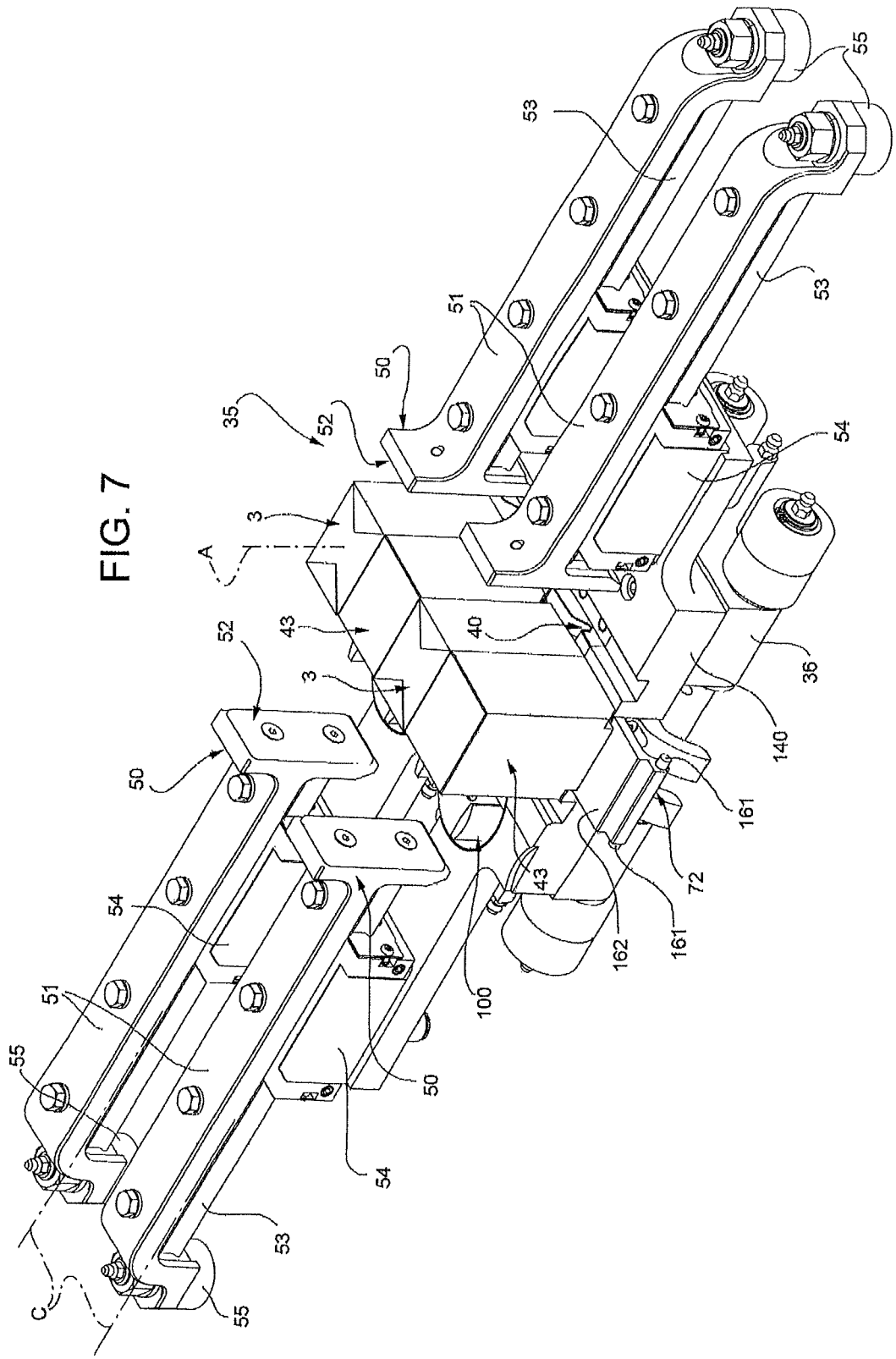
FIG. 7 is a perspective view of links forming a part of the folding unit.

Along portion Q, shells 50 integrally move parallel to direction C and relative to respective paddle 43 (FIG. 6).

In the embodiment shown, shells 50 move away relative to each other for a distance, for example, of 2-4 mm, when they move from the fully closed to the closed position.

In the following of the present description, only one link 35 will be described in detail, being clear that all links 35 are identical to each other.

Link 35 comprises (FIGS. 10 to 14):

plate 36;

paddle 43;

a pair of shells 50 which may move relative to paddle 43 along direction C;

a pair of arms 51 connected to relative shells 50, elongated parallel to direction C and comprising each a relative slide 53; and a pair of guides 54 which extend on opposite sides of relative paddle 43 along direction C, and relative to which slides 53 move parallel to direction C.

Referring again to FIGS. 1 and 2, plate 36 is arranged below, and then supports, pack 3 (or package 2) along portion P and a starting stretch of portion Q of forming path B.

Conversely, plate 36 is arranged above package 2 along portion R of forming path B. Accordingly, folded package 2 is released, under the gravity action at station 22, to conveyor 42.

Shells 50 define, on their sides opposite to arm 51, relative surfaces 52 which are adapted to cooperate with pack 3 and which face each other.

Surfaces 52 are flat, so as to control the final shape of packages 2.

Each arm 51 comprises, on its end opposite to relative shell 50, a roller 55.

Each slide 53 is arranged between relative shell 50 and roller 55 of relative arm 51. Furthermore, each slide 53 may slide parallel to direction C relative to guide 54.

In the embodiment shown, each arm 51 is integral with relative shell 50.

Paddles 43 are flat.

Advantageously, folding means 24 comprise, for each pair of links 35a, 35b consecutive to each other:
- a slot 40 defined by upstream link 35a and adapted to receive end fin 18 of a relative pack 2;
- a slide 72 operatively connected to downstream link 35b and movable between a first position (shown in FIGS. 2 and 3 with reference to links 35 moving along stretch P2) in which it engages slot 40, so as to fold end fin 18 housed therein, and a second position (shown in FIGS. 2 and 3 with reference to links 35 moving along stretch P1) in which it leaves free slot 40.

Figure 3:
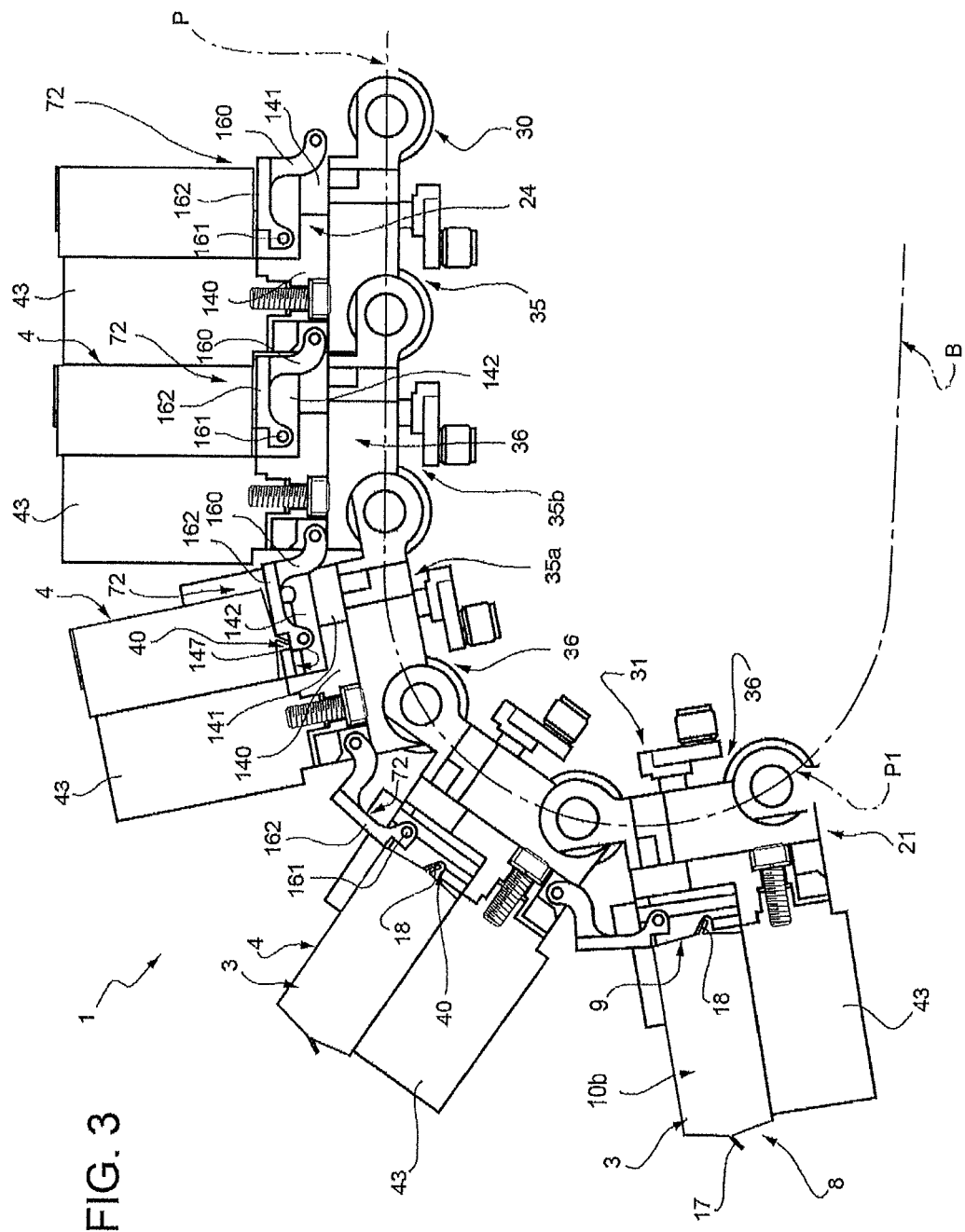
FIG. 3 is an enlarged view of some components of the unit of FIG. 2, with parts removed for clarity.

In particular, the expressions "upstream link 35a" and "downstream link 35b" indicates a pair of consecutive links 35 which are arranged respectively upstream and downstream with reference to the advancing direction of chain 60 along path B (FIG. 3).

Accordingly, it should be clear that each link comprises, with reference to the advancing direction of chain 60 along path P:
- a slide 72 adapted to engage slot 40 of an upstream further consecutive link 35; and
- a slot 40 adapted to be engaged by a slide 72 of a downstream further consecutive link 35.

In greater detail, each link 35 comprises a slide 72 which is arranged upstream of slot 40, proceeding according to the advancing direction of link 35 along path B.

Plate 36 of each link 35a, 35b comprises (FIGS. 2 and 3):
- an upstream portion 140 from which relative paddle 43 protrudes on the opposite side of cam 25 and sprockets 26; and
- a downstream portion 141 to which a body 142 is connected.

Body 142 defines slot 40 together with portion 140. In particular, slot 40 extends orthogonal to the plane in which path B lies.

Figure 16:
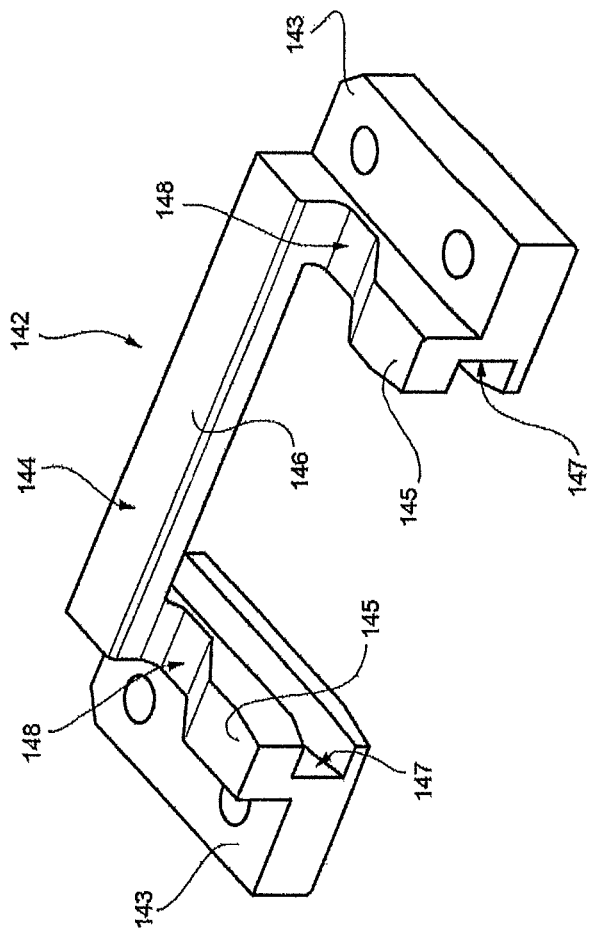
FIG. 16 is a perspective view of the body forming a part of the plate of the link.

In particular, body 142 comprises (FIG. 16):
- a pair of plates 143 connected to portion 140; and
- a C-shaped bridge 144 protruding from plate 143 on the opposite side of plate 36.

Bridge 144 comprises, in turn:
- a pair of arms 145 tangential to path B and connected to relative plates 143; and
- an arm 146 orthogonal to path B and extending between arms 145.

Arms 145 and relative plates 143 define corresponding grooves 147 tangential to path B.

Grooves 147 are open on relative sides which are opposite to relative plates 143. In other words, the open sides of grooves 147 face each other.

In particular, arm 146 supports end portion 9 of pack 3 being folded while fin 18 is housed with room inside slot 40.

Arms 145 comprise, on opposite side to plate 143, relative recesses 148 which are open on the opposite side to plate 36.

Recesses 148 laterally delimit slot 40 and are adapted to cooperate with opposite respective lateral ends of fin 18.

Slide 72 comprises, starting from portion 140 of downstream link 35b towards upstream link 35a, (FIGS. 7 and 9 to 15):
- a lever 160 hinged to upstream portion 140 about an axis which is orthogonal to the plane of path B;
- a plate 162 lying on a plane which is tangential to path B and an end of which enters slot 40, when slide 72 reaches the first position; and
- a pair of pins 161 which protrude from plate 162 on the opposite side of lever 160 and slide inside relative grooves 147 of body 142 connected to immediately upstream link 35a.

In detail, plate 162 protrudes from plate 36 on the opposite side of body 142.

Figure 17:
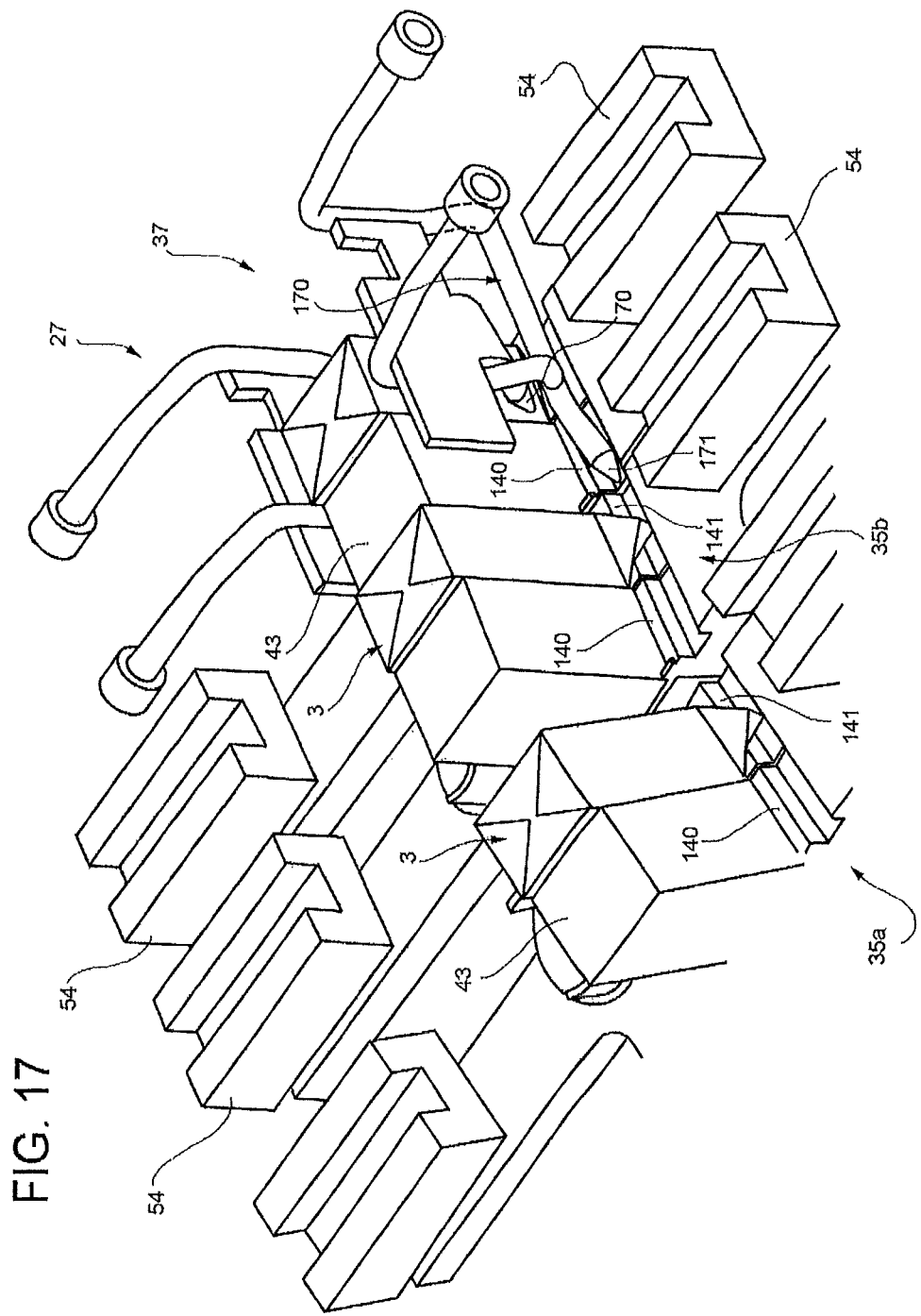
FIG. 17 is a perspective view of packs being transported to folding means and a heating unit.

Folding means 37 also comprise a pair of raising element 170 (FIGS. 8 and 17) having respective ends 171 interacting with flaps 20, as relative packs 3 move along stretch $P_2$ of path B.

In detail, element 170 are shaped as cylinders.

Elements 170 are stationary relative to path B, and are, in the embodiment shown, fitted to frame 29.

Figure 2:
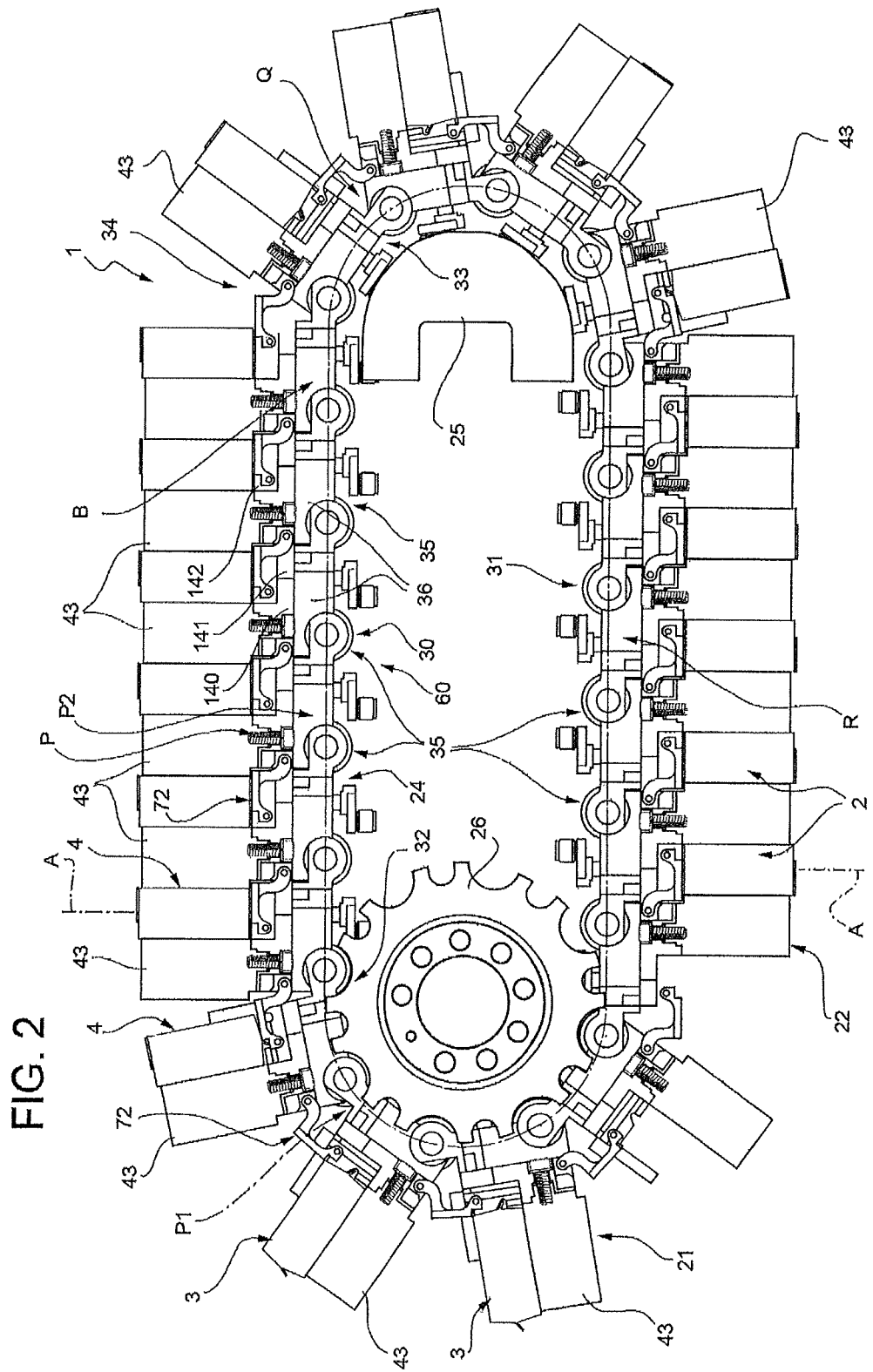
FIG. 2 is an enlarged side view of the folding unit of FIG. 1, with parts removed for clarity.

As shown in FIGS. 2 and 3, slide 72 is arranged in the second position at station 21, moves from the second to the first position along curved stretch P1 of path B, remains in the first position along straight stretch P2 of path B, moves from the first position to the second position along curved portion Q of path B, and remains in the second position along straight portion R of path B and from station 22 to station 21.

In detail, the movement of slide 72 from the second position to the first position along curved stretch P1 is due to the fact, that the angular distances between consecutive links 35a, 35b decreases, as these links 35a, 35b move along curved stretch P1 in the advancing direction of chain 60.

More precisely, fin 18 of pack 3 is arranged within open slot 40 of link 35 at station 21

Due to the fact that slide 72 is carried by downstream link 35b, slot 40 is carried by upstream link 35a and longitudinal sealing band 4 is formed on wall 10a which is arranged downstream proceeding according to the advancing sense of link 35 along path B, slide 72 folds fin 18 onto end portion 9 towards upstream link 35a. Accordingly, slide 72 folds fin 18 on the opposite side of longitudinal sealing band 4.

At this stage, ends 171 raise flaps 20 towards end portion 8 and bend flaps 20 relative to axis A, up to when they reach the position shown in FIG. 8.

In the very same way, the movement of slide 72 from the first position to the second position along curved stretch Q is due to the fact that the angular distances between consecutive links 35a, 35b increases, as these links 35a, 35b move along curved stretch Q in the advancing direction of chain 60.

The corresponding shells 50, as moving from the open to the fully closed position, press flaps 20 against top ends of relative walls 10b, downstream from folding means 23 and heating device 17, proceeding according to the advancing direction of chain 60.

Unit 1 also comprises a pair of cams 61 (FIGS. 4 and 5) adapted to control the movement of each pair of shells 50 between relative fully closed position, closed position and open position, as each pair of shells 50 advances along path B.

Furthermore, cams 61 also control the movement of each pair of shells 50 integrally to each other along direction C and relative to paddle 43 of corresponding link 35.

In detail, cams 61 are arranged on opposite lateral sides of chain 60.

One cam 61 comprises a groove 62 which is engaged by rollers 55 of first shells 50.

The other cam 61 comprises a further groove 62 which is engaged by rollers 55 of second shells 50.

Figure 4:
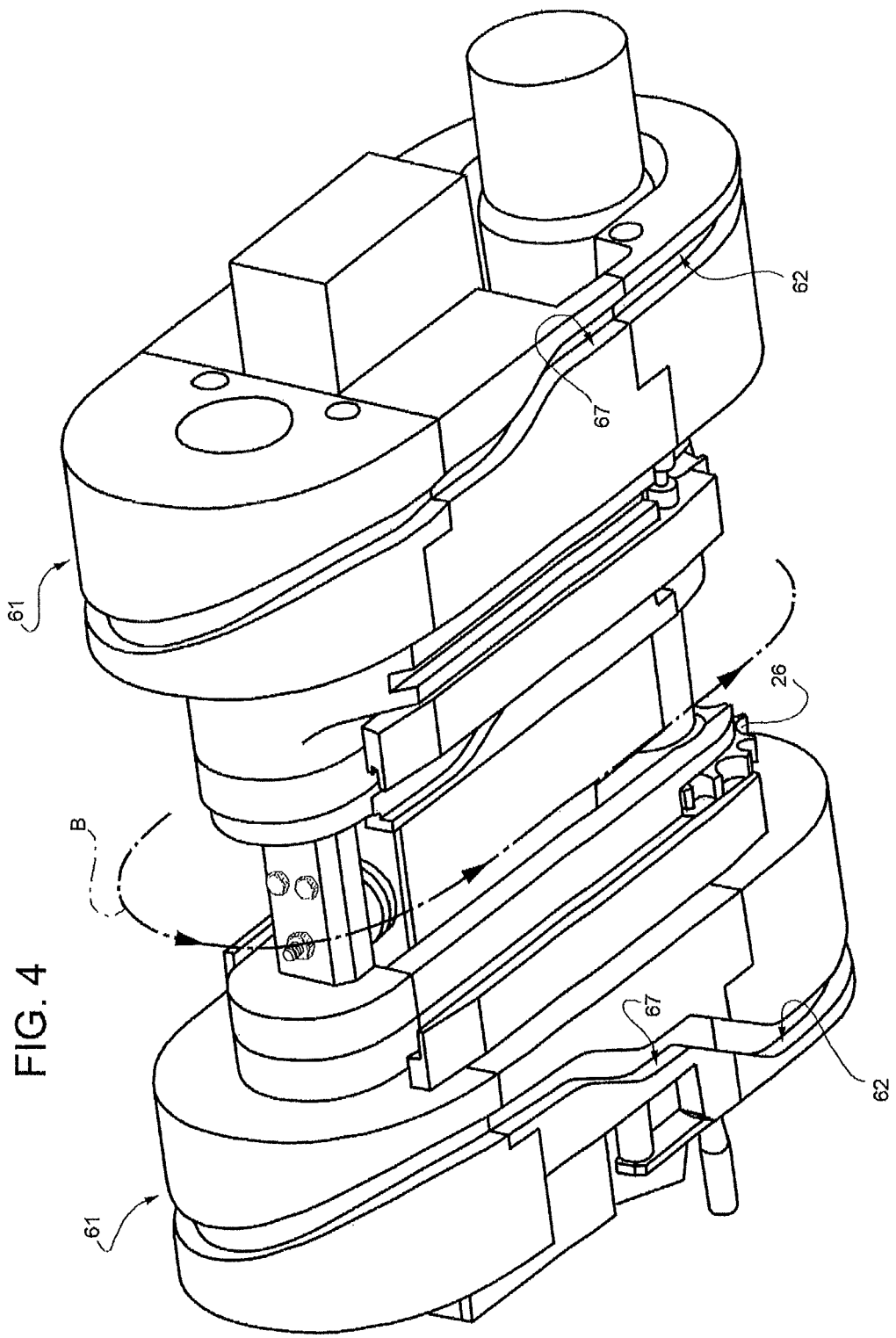
FIG. 4 is a perspective view of a pair of cams forming a part of the disclosed folding unit.
Figure 5:
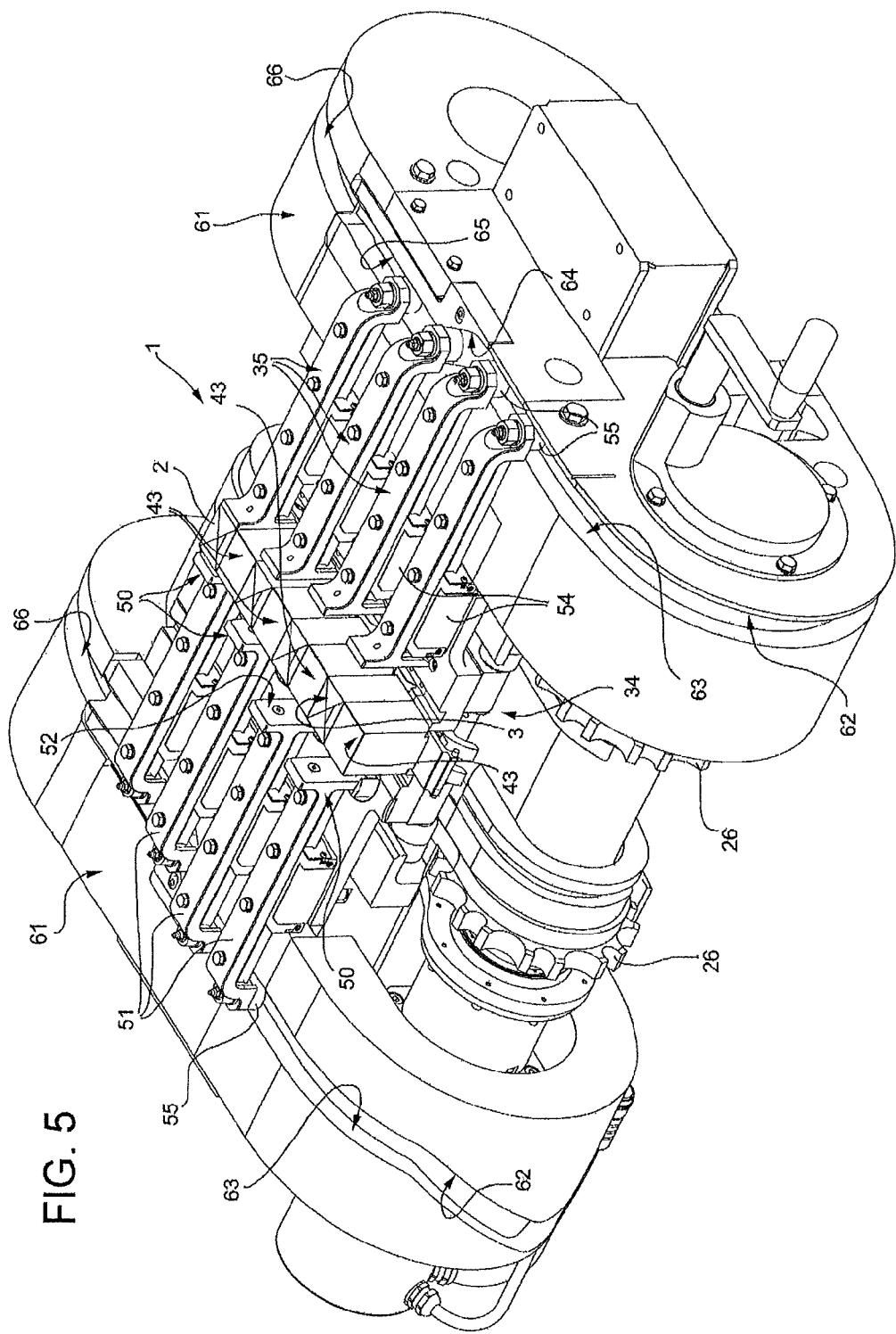
FIG. 5 is a perspective view of the cams together with links forming a part of the folding unit.

With reference to FIGS. 4 and 5, grooves 62 comprise, proceeding from station 21 to station 22:
- relative straight portions 63 which are adapted to keep shells 50 of each pair in the open position;
- relative converging portions 64 which are adapted to move shells 50 from relative open position to relative fully closed portion along stretch P2 of portion P;
- relative straight portions 65 which are adapted to keep shells 50 of each pair in respective fully closed position;
- relative curved portions 66 which are adapted to move shells 50 from respective fully closed position to respective closed position; relative curved portions 66 are also adapted to integrally move shells 50 with respect to paddle 43 and parallel to respective directions C; and relative curved portions 67 which are adapted to move shells 50 from respective closed position to respective open position.

Folding means 23 comprise a guide member 45 fitted in a fixed position between station 21 and heating device 27 (FIG. 1).

Guide member 45 defines a contrast surface 46 converging towards chain 60 and cooperating in a sliding manner with end portion 8 of each pack 3 to compress and flatten end portion 8 towards chain 60.

Frame 29 also comprises a pair of fixed sides 68 (only one shown in FIG. 1) for laterally containing packs 3 along path B, located on opposite sides of chain 60, and extending between station 21 and heating device 27.

Heating device 27 comprises (FIGS. 1, 8 and 9):

an air device 69 fitted to frame 29;

a pair of first nozzles 70 connected to device 69 and adapted to direct hot air onto flaps 20 of each pack 3 before each pack 3 reaches final pressing device 28; and a pair of second nozzles 71 connected to device 69 and adapted to direct hot air onto flaps 19 of each pack 3 before a relative pair of shells 50 reaches the fully closed position.

Pressure device 28 comprises (FIG. 1) a belt 80 wound onto a drive wheel 81 and a driven wheel 82. Belt 80 comprises, on its outer surface opposite to wheels 81, 82, a plurality of projections 83 which are adapted to press flaps 19 of each pack 3 onto relative fin 17.

The volume of each package 2 in formation is controlled, downstream from heating device 27, within a compartment bounded by:

paddles 43 of relative link 35 and of the link 35 arranged immediately downstream proceeding according to the advancing direction of chain 60;

shells 50 of relative link 35 which are arranged in the fully closed position;

plate 72 of relative link 35 arranged in the first position; and belt 80.

Operation of unit 1 will be described with reference to one pack 3 and to relative link 35a (35b) as of an initial instant, in which pack 3 is fed from the in-feed conveyor 41 to chain 60 at station 21 of path B.

In this condition, link 35a (35b) is moving at the beginning of stretch P1 and therefore slot 40 is open. Furthermore, shells 50 are arranged in the open position.

In detail, pack 3 is positioned with end fin 18 facing plate 72 of link 35, and slides on one wall 10a along relative paddle 43, so that fin 18 is parallel to paddle 43, until when fin 18 enters open slot 40.

In this condition, pack 3 is arranged above and, therefore, supported by arm 145 of body 142 carried by link 35a (35b).

More precisely, paddle 43 cooperates with wall 10a opposite to sealing band 4 of pack 3.

As link 35a (35b) moves along stretch P1 and a portion of stretch P2, contrast surface 46 cooperates in a sliding manner with end portion 8 of pack 3. In this way, portions 8 and 9 are flattened towards each other, fin 17 is folded onto flattened portion 8 and flaps 20 are bent relative to portion 8 towards axis A and on the opposite side of portion 8, as shown in FIG. 9.

In this condition, fin 18 is housed with room inside slot 40.

At the same time, each pair of consecutive links 35a, 35b moves towards each other along stretch P1. In this way, the angle between consecutive links 35a, 35b decreases along stretch P1.

Accordingly, lever 160 rotates about portion 140 of downstream link 35a, and plate 162 moves towards slot 40 of upstream link 35a while pins 161 slide inside relative grooves 147 of body 142 of upstream link 35a.

At the end of stretch P1, plate 72 of the link 35a is the first position in which it engages slot 40.

As plate 72 engages slot 40, fin 18 is folded onto end portion 9. In particular, fin 18 is folded on the opposite side of sealing band 4, i.e. towards wall 10a arranged upstream with reference to the advancing direction of chain 60.

Simultaneously, fixed raising elements 170 raise flaps 20 towards end portion 8 and bend flaps 20 relative to axis A, as shown in FIGS. 8 and 9.

As link 35b moves along stretch P2, shells 50 move from the open position to the fully closed position and plate 72 is arranged in the first position.

Before shells 50 reach pack 3, nozzles 70, 71 direct air onto flaps 19, 20 of pack 3, to partly and locally melt the packaging material of flaps 19, 20 (FIG. 9) and of the portion of main portion 7 facing flaps 19, 20.

Immediately after, shells 50 contact walls 10b of packs 3, and press flaps 20 onto relative top ends of walls 10b as flaps 20 cool. In this condition, shells 50 are arranged in the fully closed position.

Subsequently, pack 3 is arranged below belt 80 and projections 83 press flaps 20 onto portion 9, as flaps 20 cool.

In this condition, the volume of folded package is controlled by two paddles 43 of respective consecutive links 35a, 35b by shells 50 arranged in the fully closed position, and by projections 83 of belt 80.

Folded package 2 then move along portion Q of path B.

Along portion Q, shells 50 move relative to each other from the fully closed position to the closed position, in which they grip package 2 but substantially do not exert any pressure thereon.

Furthermore, shells 50 move together with package 2 relative to paddle 43 parallel to direction C, along portion Q.

Figure 10:
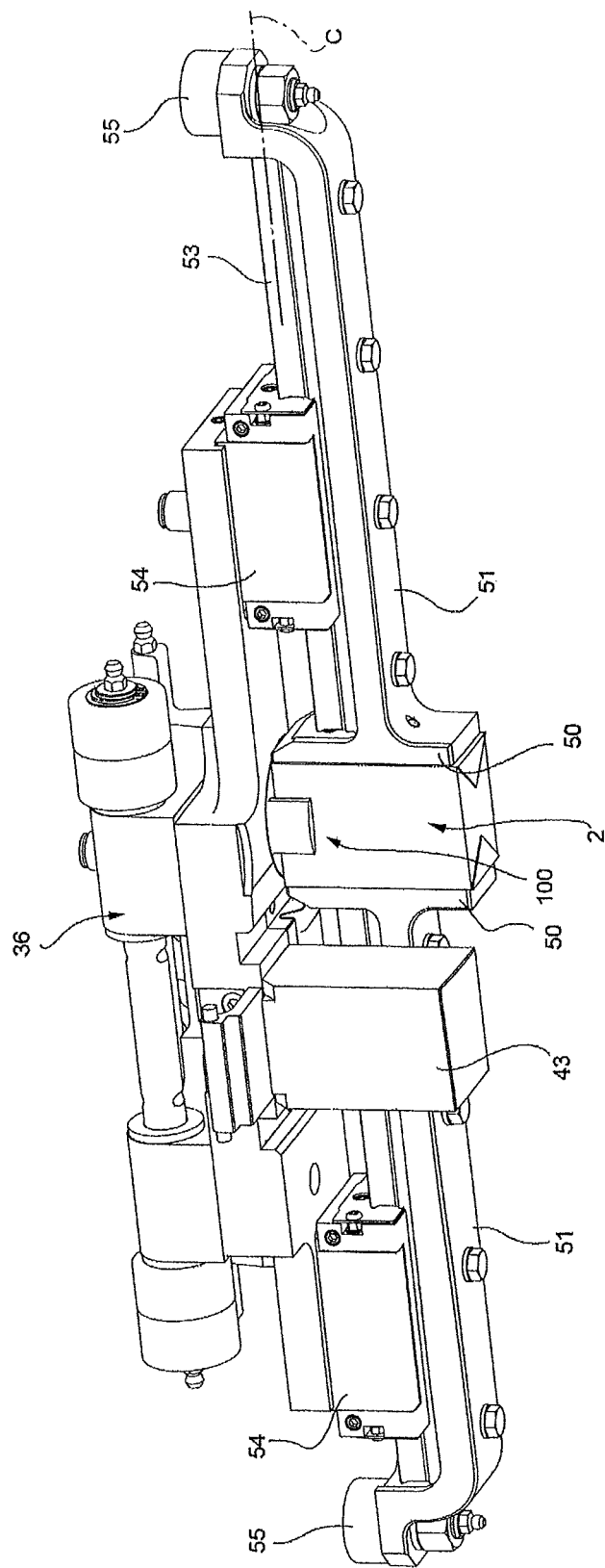
FIG. 10 is a perspective view of a portion of a link forming a part of the transport element.
Figure 11:
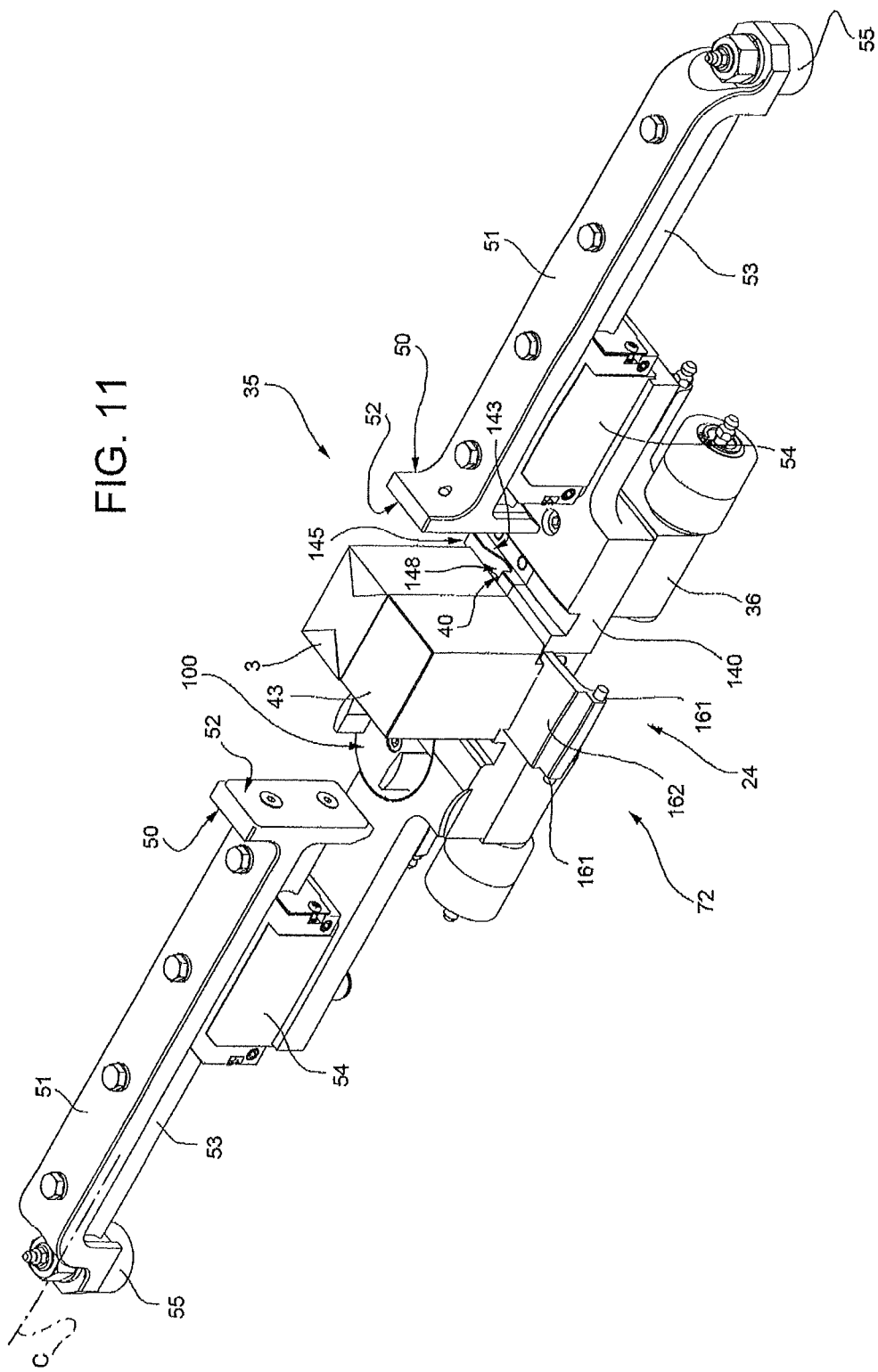
FIG. 11 is a top perspective view of the portion of the link illustrated in FIG. 10 in which arms forming a part of the link are relatively moved.
Figure 12:
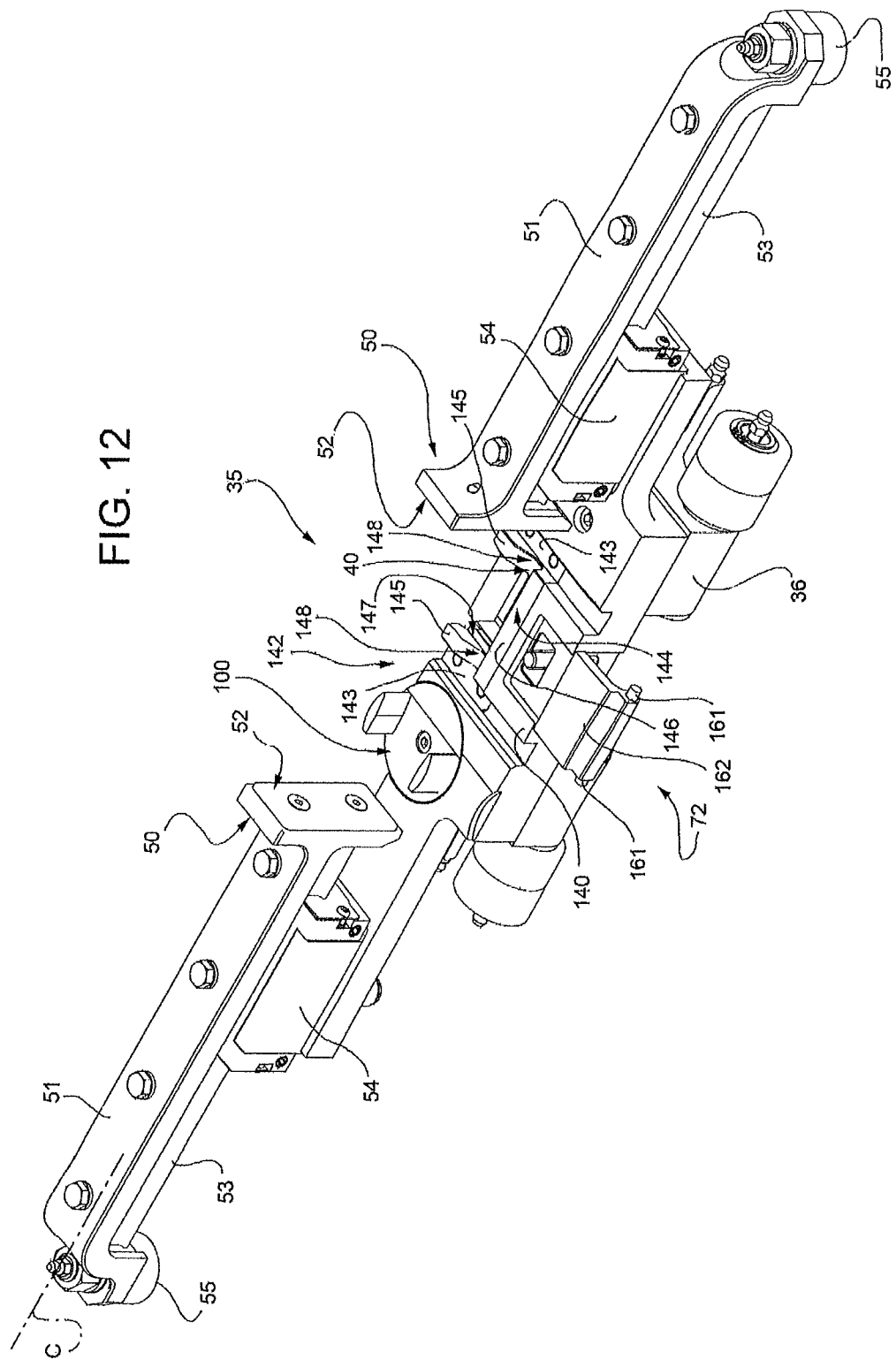
FIG. 12 is a top perspective view similar to FIG. 11 of the link, but with features illustrated in FIG. 11 removed.
Figure 13:
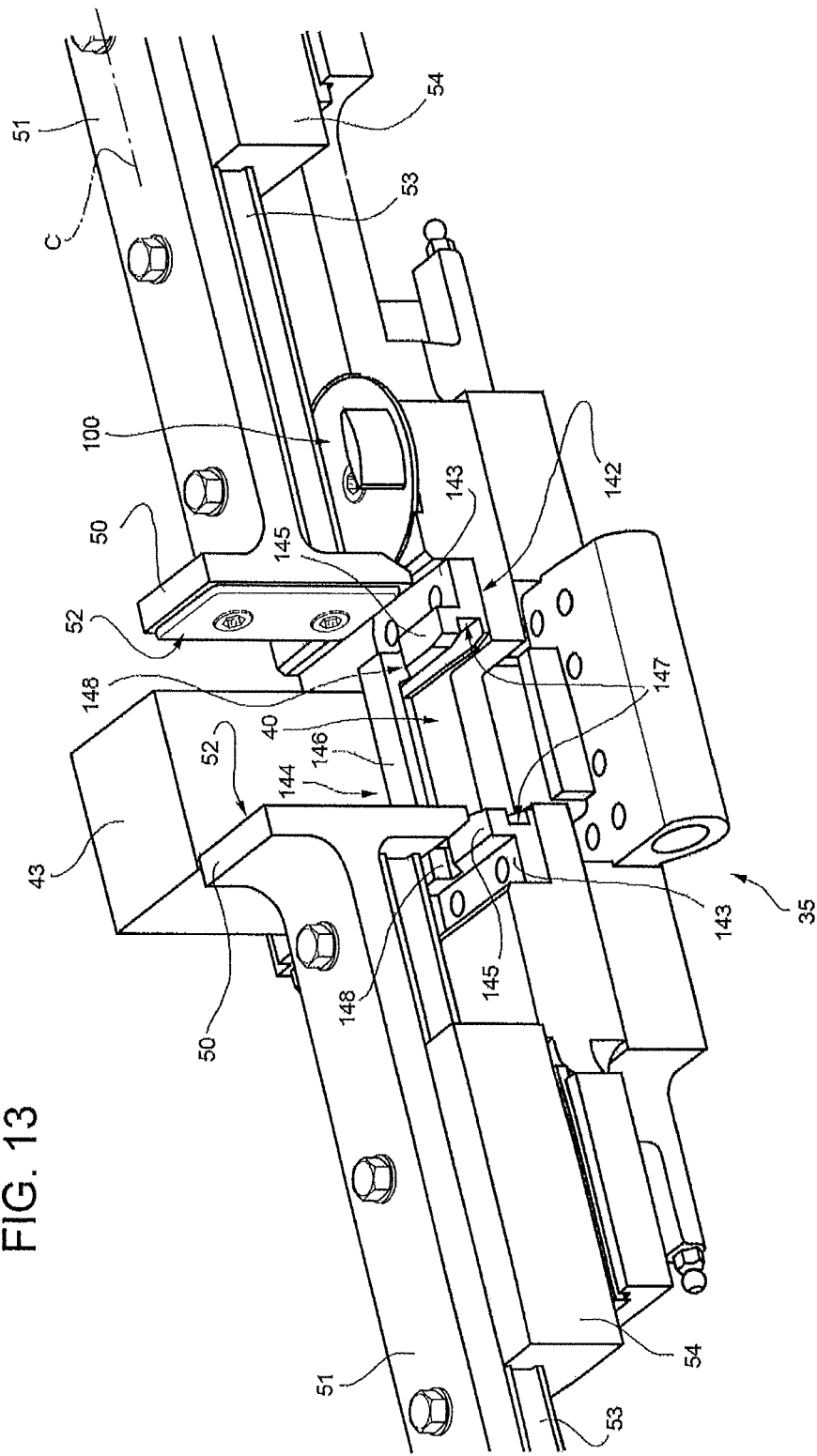
FIG. 13 is an enlarged top perspective view of a portion of the link illustrated in FIG. 10.
Figure 14:
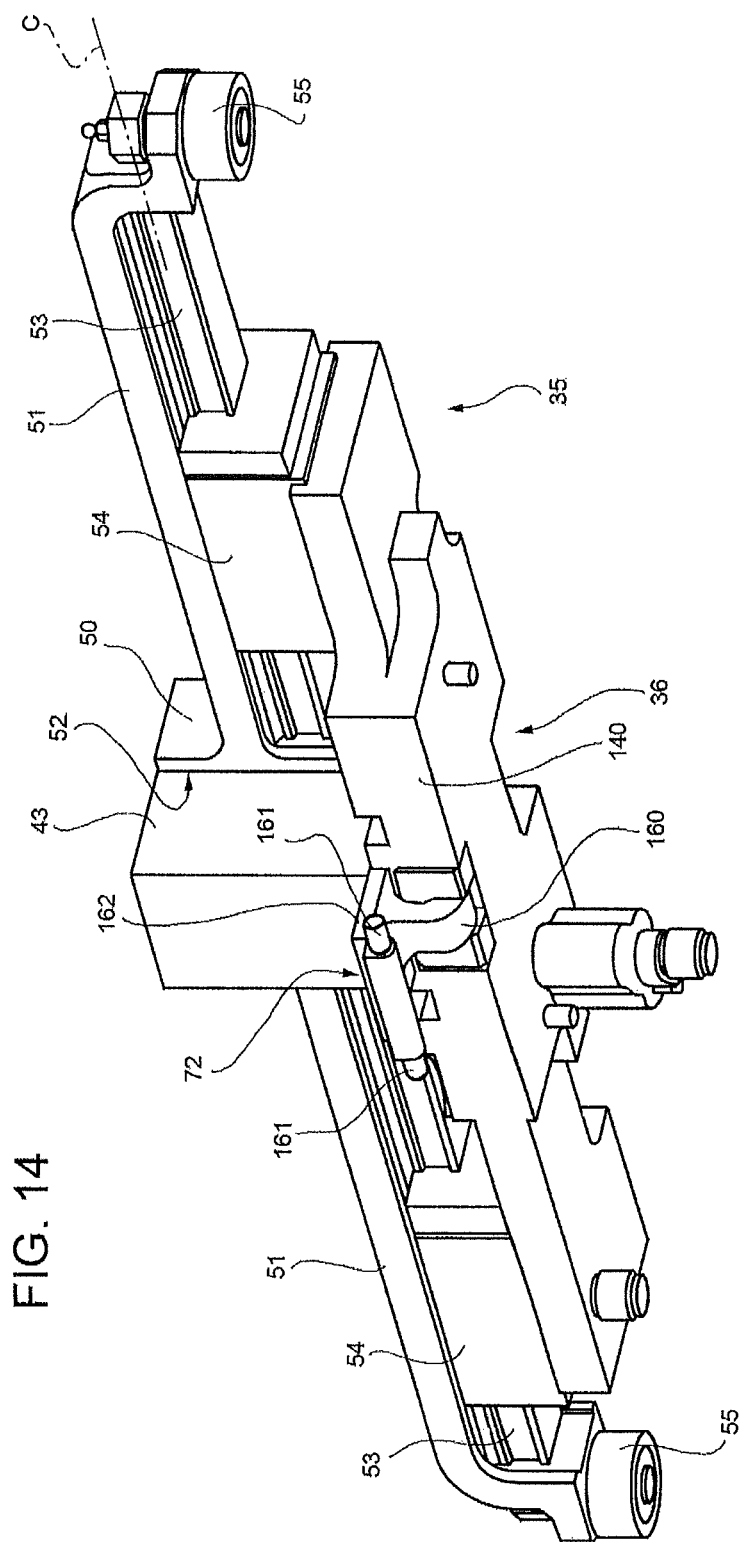
FIG. 14 is a bottom perspective view of the link.
Figure 15:
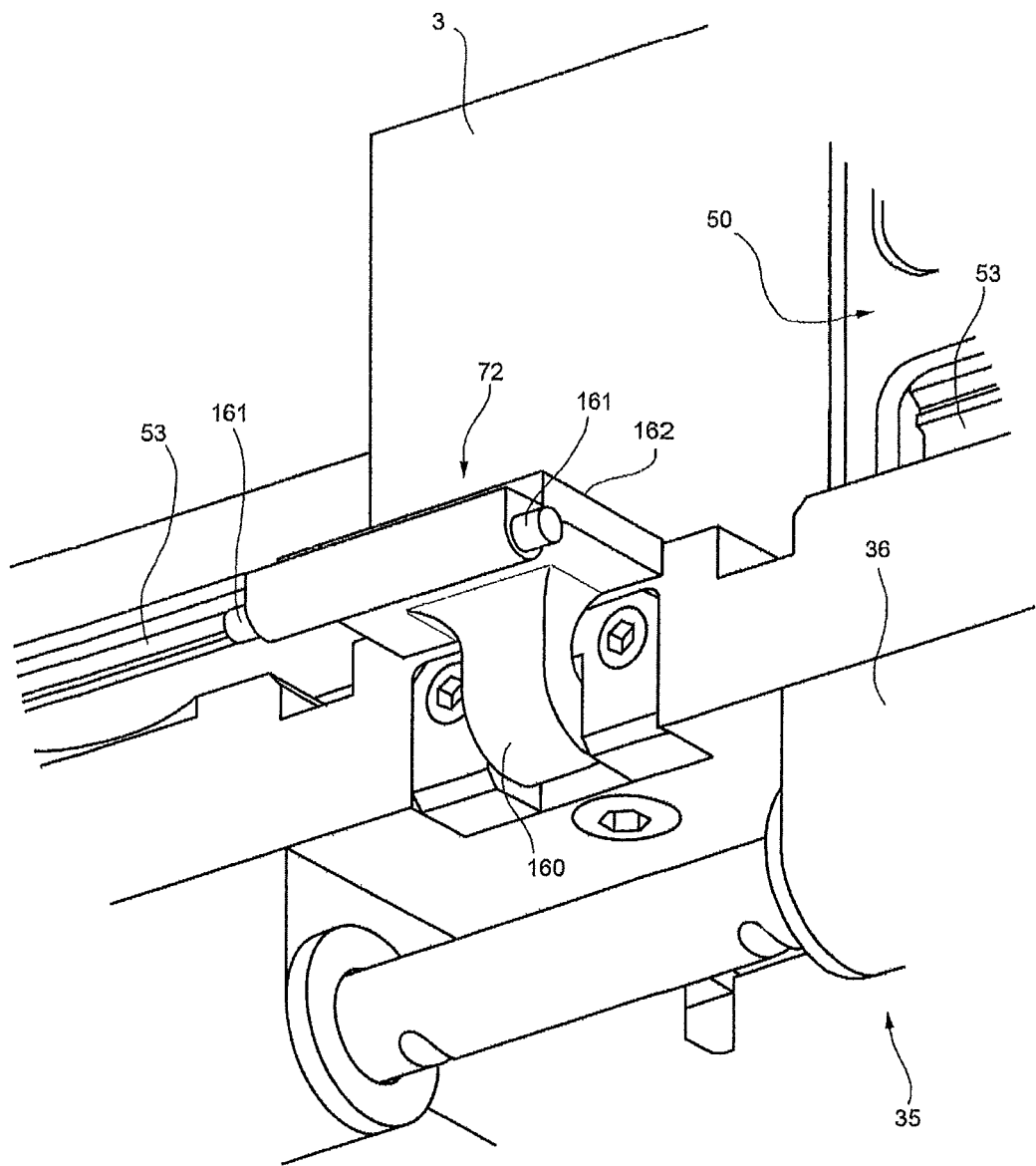
FIG. 15 is an enlarged bottom perspective view of a portion of the link.

In this way, shells 50 together with folded package 2 are staggered from paddle 43, at the end of portion Q, so as to be releasable by link 35 without interference with paddle 43 (FIG. 10).

Furthermore, along portion Q and with shells 50 in the fully closed position, package 2 engages a rotating device 100 shown in FIGS. 7, 10, 11, 12 and 13.

Device 100 is described in more detail in the European application filed by the Applicant with the number EP11187350.1.

Along portion Q, each pair of consecutive links 35a, 35b move away from each other, as shown in FIG. 1.

Accordingly, plate 72 of downstream link 35b moves back from the first to the second position, in which it leaves free slot 40 of upstream link 35a.

Finally, folded package 2 and shells 50 arranged in the closed position are conveyed along portion R.

It is important to mention that during the descending stretch of portion Q and along portion R of path B, folded package 2 is arranged below plate 36 and is supported by the shells 50 arranged in the closed position.

At station 22, shells 50 move back to the open position and package 2 is released, under the gravity action, to the out-feed conveyor 42.

Being staggered relative to shells 50 and package 2, paddle 43 does not interfere with the release of package 2.

Subsequently, shells 50 are conveyed by chain 60 towards station 21.

The advantages of unit 1 according to the present invention will be clear from the foregoing description.

In particular, unit 1 folds whole fin 18 of each pack 3 on end portion 9, by moving plate 72 of downstream link 35*a* from the second position to the first position in which it engages slot 40 of upstream link 35*a*.

In this way, the folding of fin 18 is achieved by using a pair of elements, namely slot 40 and plate 72, which are both movable along path B together with respective upstream link 35*a* and downstream link 35*b*.

Accordingly, the bending of the fin 18 is particularly precise and highly repeatable, when compared with the known solution which are described in the introductory part of the present description.

As a result, the overall quality of the folding is particularly high as well as the overall final aspect of packages 2.

In particular, the Applicant has found that fin 18 of each pack 3 is folded onto end portion 9 much more coplanar than in the unit disclosed in the introductory part of the present description.

Clearly, changes may be made to unit 1 without, however, departing from the protective scope defined in the accompanying Claims.

Unit 1 could comprise only one cam 61.

Unit 1 could form package 2 having a round or polygonal cross-section.

The invention claimed is:

1. A folding unit for producing packages of pourable food products from sealed packs having each a main portion and opposite end portions arranged on opposite sides of said main portion, with a longitudinal sealing band extending along the main portion and being located on the end portions; each pack comprising, for each end portion, an end fin and a pair of flaps projecting laterally from said main portion;
   said unit comprising:
   a conveyor which is fed with a plurality of said packs and which feeds the pack along a forming path; and
   folding means which interact with each said pack along said forming path to fold a respective end fin onto a respective end portion;
   said conveyor comprising at least one first link and one second link articulated to each other;
   said second link being arranged downstream of said first link, with reference to a first direction, along which said conveyor advances along said forming path;
   said first link including a slot that receives said end fin;
   wherein said folding means comprise:
   the slot that receives the end fin, and
   a slide operatively connected to said second link and movable between a detached position in which the slide is detached from the slot and an engaged position in which said slide at least partially engages said slot, so as to fold said end fin onto said respective end portion and in a second direction, opposite to said first direction, the folding of the end fin in the second direction resulting in folding of the end fin away from the longitudinal sealing band on the respective end portion.

2. The folding unit of claim 1, wherein said slide is hinged to said second link.

3. The folding unit of claim 1, wherein said slide comprises:
   a plate adapted to interact with said end fin and to fold it; and
   an arm integral with said plate and hinged to said second link.

4. The folding unit of claim 1, further comprising a body connected to said first link and which defines said slot together with said first link.

5. The folding unit of claim 4, wherein said body defines a pair of recesses which are open on the opposite side of said first link and are adapted to house respective lateral portions of said fin.

6. The folding unit of claim 4, wherein said slide comprises a pair of pins and in that said body defines a pair of grooves arranged on respective lateral sides of said slot and adapted to guide said pins, when said slide moves between said first and second position.

7. The folding unit of claim 6, wherein said slot extends transversally to said path and said grooves extend tangentially to said path.

8. The folding unit of claim 1, wherein each said first link and second link comprises a respective said slot and a respective said slide.

9. The folding unit of claim 1, wherein each said first link and second link comprises:
   said slot; and
   said slide which is arranged upstream of said slot, proceeding according to the advancing sense of said first link and second link along said forming path.

10. The folding unit of claim 1, further comprising a fixed element which is adapted to raise, in use, said flaps towards said main portion.

11. The folding unit of claim 1, wherein said forming path is a closed loop path comprising:
    a first curved portion along which said first and second link is fed, in use, with a respective said pack to fold, and along which said first and second links move towards to each other; and
    a second rectilinear portion arranged downstream from said inlet portion along which said first and second link move substantially integrally to each other;
    said slide moving, in use, from said second position to said first position along said first curved portion;
    said slide being arranged, in use, in said first position along said second rectilinear portion.

12. The folding unit of claim 11, wherein said forming path comprises also a second curved portion arranged downstream from said rectilinear portion proceeding along said advancing direction of said conveying member, and along which said first link and second link move, in use, away from each other; said slide moving, in use, from said first position to said second position, along said second curved portion.

* * * * *